United States Patent Office 3,574,673
Patented Apr. 13, 1971

3,574,673
COATED CUTTING EDGES
Carl W. Schweiger, Coleman, Mich., assignor to Dow Corning Corporation, Midland, Mich.
No Drawing. Continuation-in-part of application Ser. No. 798,770, Feb. 12, 1969. This application Apr. 24, 1969, Ser. No. 819,123
Int. Cl. B32b 15/08
U.S. Cl. 117—132                      7 Claims

ABSTRACT OF THE DISCLOSURE

Articles having fine cutting edges, such as razor blades, the edges of which are coated with copolymers of methylsiloxane and aminoalkylsiloxane units, such as

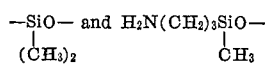

to reduce the cutting force necessary to utilize the article.

---

This application is a continuation-in-part of copending application Ser. No. 798,770, filed Feb. 12, 1969, now abandoned.

This invention relates to coated cutting edges. In one aspect, the invention relates to articles having fine cutting edges which are coated with an at least partially cured organosiloxane copolymer. In another aspect, the invention relates to single-or double-edge safety razor blades having coated cutting edges.

Many articles are manufactured with fine cutting edges, usually of honed metal. Exemplary of such articles are razor blades, hypodermic needles, scissors, scalpels and currettes. Illustrative of fine or honed cutting edges are those of a conventional steel safety razor blade, the blade itself being from 0.003 to 0.015 inch thick and having wedge-shaped cutting edges, the included solid angle of which is greater than 14° and less than 35°. The faces or sides of the blade edge extend back from the edge for a distance of up to 0.1 inch or more. The blade edge face need not consist of a single uninterrupted planar surface, but can consist of two or more such surfaces intersecting each other along a zone generally parallel to the ultimate edge. The ultimate edge may have a width as small as 0.0003 inch and a thickness of less than 6000 angstrom units. The cutting edge geometry of other articles, such as hypodermic needles and scalpels, varies with the particular utility and is well known in the industry.

The honed cutting edges are generally steel, which may be either carbon steel or a hardenable stainless steel. The steel is usually hardened by a suitable heat-treating process. There is a limit to the extent that a cutting edge may be reheated since excessive reheating will result in loss of hardness. Metals, for example, chromium or metal alloys other than steel and stainless steel can be employed in fabricating cutting edges.

It is known that the cutting edges of razor blades can be coated with certain polymeric materials in order to increase shaving comfort. Fluorocarbon coatings, such as polytetrafluoroethylene, are disclosed in U.S. Pat. 3,071,856, while coatings of organosilicon-containing polymers are described in U.S. Pat. 2,937,976. Fluorocarbon coatings on razor blades are commercially available at the present time, but the coating process requires elevated temperatures for long periods of time. The organosilicon coating process does not require such severe conditions, but the coated blade has had only limited commercial acceptance because of the poor durability of the organosilicon-containing polymer coating.

It is an object of the invention to porvide a fine cutting edge having ad urable coating of organosiloxane copolymers.

It is also an object of the invention to provide an improved safety razor blade.

Another object of the invention is to provide a method of fabricating improved coated cutting edges.

These and other objects will be apparent to one skilled in the art upon consideration of the following specification and appended claims.

According to the invention, there is provided an article having a fine cutting edge of metal, the edge having an adherent coating consisting essentially of an at least partially cured organosiloxane copolymer consisting of (1) 5 to 20 weight percent of polymeric units of the formula

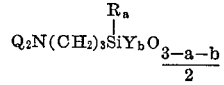

in which

R is a lower alkyl radical containing no more than 6 carbon atoms;
Y is selected from the group consisting of —OH and —OR' radicals, in which R' is an alkyl radical of no more than 3 carbon atoms;
Q is selected from the group consisting of the hydrogen atom, —CH$_3$ and —CH$_2$CH$_2$NH$_2$;
$a$ has a value of 0 or 1; and
$b$ has a value of 0 to 1; the sum of $a+b$ being from 0 to 2; and (2) 80 to 95 weight percent of polymeric units the formula

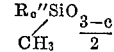

in which

R'' is selected from the group consisting of —OH and —CH$_3$ radicals; and
$c$ has a value of 1 or 2.

As described above, the aminoalkyl siloxane units can contain lower alkyl substituents, such as methyl, ethyl, propyl, t-butyl and hexyl radicals. In addition, those copolymers which are not fully condensed will contain hydroxyl or alkoxy substituents, such as methoxy, ethoxy, and propinoxy radicals. The Q substituents bonded to the nitrogen atom can be the same or different. Thus the aminoalkylsiloxane units include

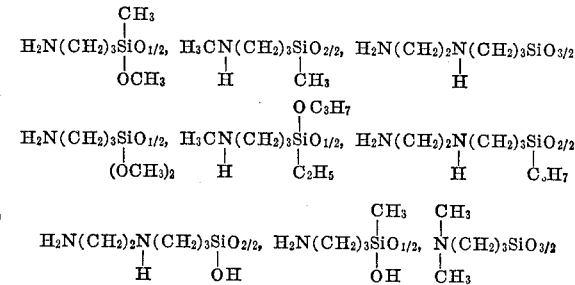

and the like.

The methylsiloxane units of the copolymer include

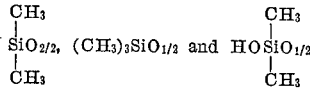

The copolymers utilized in the practice of the invention are commercially available and are prepared by well known methods, such as co-hydrolysis and co-condensation or equilibration of aminoalkyl-substituted aminoalkyl polysiloxane with dimethylpolysiloxane in the presence of an alkaline equilibration catalyst.

A preferred method of preparation is discussed in detail in U.S. 3,355,424. In brief this method comprises mixing the appropriate molar amounts of (polyaminoalkyl) alkoxysilane, $Q_2N(CH_2)_3SiR_a(OR)_{3-a}$ with a conventional dimethylpolysiloxane which contains a substantial amout of silicon-bonded hydroxyl groups, for example, 1 to 5 percent by weight ≡SiOH. The reaction to form new siloxane bonds is illustrated as follows:

$$\equiv SiOR' + HOSi \equiv \rightarrow \equiv SiOSi \equiv + R'OH$$

The reaction rate is accelerated by heating in the range of 100 to 200° C. Inert solvents can be present if desired. The alcohol which is formed in this reaction can be removed by distillation, thus it is certain that true copolymers are formed. It is apparent that the copolymer can have unreacted (OR') and/or (OH) groups present, depending upon the relative amounts of reactants and the amount of (OR') and (OH) present in the reactants initially. If desired, excess (OR') groups can be hydrolyzed by the addition of water to the system. Controlling the amount of water so added controls the amount of such groups remaining in the copolymer. Likewise, excess (OH) groups can be caused to condense, as for example by heating the copolymer. Any or all of the alcohol formed by either the reaction or by subsequent hydrolysis can be left in the reaction product if desired.

The copolymeric coating is in the form of a stable material which is adherent to the underlying surface of the cutting edge. As used in this specification, "at least partially cured copolymer" is defined as a crosslinked or partially crosslinked copolymer which has insoluble, infusible coherent three-dimensional structure, within which an uncured or partially cured fluid copolymer is contained. The material is relatively soft and waxy as contrasted to hard vitreous resins, which develop fractures when coated onto cutting edges.

The "curing" can be accomplished by heating at elevated temperatures or by exposure to ambient temperature and humidity for longer periods of time. The copolymer does not cure to a hard resin, therefore the curing conditions can be varied widely. If desired the copolymer can be partially crosslinked prior to its application to the cutting edge and the cure later completed in situ on the edge.

The copolymeric coating may extend over the entire face of the cutting edge or it may cover only a portion of the face and the ultimate edge. The exact thickness of the coating does not appear to be critical, coatings as thin as two microns being effective. While not necessary for operability, it is desirable that the thickness of the coating be substantially uniform throughout.

The initially fluid or liquid copolymer is applied directly to the clean cutting edge in any suitable manner, for example by dipping, brushing or spraying the material onto the edge. The copolymer can be applied from an inert solvent carrier, such as isopropyl alcohol, toluene, benzene and the like. To obtain optimum bonding or adherence of the copolymer to the underlying metal edge all foreign material such as organic grease and oil should be removed from the face of the cutting edge. This can be accomplished by washing in a suitable solvent, such as benzene, trichloroethylene or carbon tetrachloride, and drying.

After evaporation of any diluent or solvent carrier, the copolymer is cured to the desired degree. The copolymer can be cured by heating for a short time (30 minutes at 120° C.) or by exposure to room temperature and humidity conditions for longer periods of time.

The following examples are illustrative of the invention which is delineated in the claims.

EXAMPLE 1

A number of aminoalkylsiloxane-dimethylsiloxane copolymers were prepared and tested as coatings on cutting edges. The copolymers were prepared by reacting mixtures of 10–20 weight percent $$H_2N(CH_2)_2NH(CH_2)_3Si(OCH_3)_3$$

and 80–90 weight percent certain dimethylpolysiloxanes in a solvent at reflux temperature for 8 hours with continuous stirring. The table sets forth the reactants and amounts used in preparation of the various copolymers:

| Reactants | Copolymer formulation | | | | | |
|---|---|---|---|---|---|---|
| | A | B | C | D | E | F |
| Wt. percent dimethylsiloxane polymer No. 1 | 30 | 33 | 30 | ---- | 35 | 35 |
| Wt. percent dimethylsiloxane polymer No. 2 | 10 | 10 | 15 | 10 | 8 | 10 |
| Wt. percent dimethylsiloxane polymer No. 3 | ---- | ---- | ---- | 35 | ---- | ---- |
| Wt. percent $H_2N(CH_2)_2NH(CH_3)Si(OCH_3)_3$ | 10 | 7 | 5 | 5 | 7 | 5 |
| Wt. percent isopropyl alcohol (solvent) | 15 | 15 | 15 | 15 | 15 | 15 |
| Wt. percent Stoddard solvent | 35 | 35 | 35 | 35 | 35 | 35 |

Polymer No. 1: 12,500 cs. $HO[(CH_3)_2SiO]_nH$ in which 40% of the —OH endblocking groups are replaced with $(CH_3)_3Si$— groups.

Polymer No. 2: 80 cs. $HO[(CH_3)_2SiO]_nH$ stripped of substantially all cyclic polymer.

Polymer No. 3: 16,000 cs. $HO[(CH_3)_2SiO]_nH$.

The reacted mixtures were then dissolved in toluene to form 5 weight percent solutions of the copolymer and sprayed onto uncoated stainless steel oxide double edged safety razor blades which had been cleaned by a methyl chloroform vapor degreasing technique followed by chemical cleaning with an alcoholic saturated potassium hydroxide solution to remove oxidized stropping compound. After spraying, the solvent was removed by maintaining the coated blades at 100° C. for 15 minutes. The spray coating was allowed to cure for about 2 hours at 76° F. and 52% relative humidity. The thickness of the coating generally increased away from the edge and, at 600× magnification, a series of five interference fringes were observed near the edge.

The coated blades were tested by means of a cutting force analyzer in which a strain gage and recorder were used to measure the force required to cut nylon fibers of 4-mil and 6-mil diameter. The blades were fixed in a chuck at a cutting angle of 20°. The fibers were mounted on a sliding holder which carried the fibers into contact with the cutting edge at a constant rate. Five initial cuts were made on 4-mil fibers to obtain optimum peel-back of the coating. Then three cuts were made on 4-mil fibers and three cuts made on the 6-mil fibers. All cuts were made at the same point on the cutting edge. Five points per blade evaluated and the mean value of the 15 cuts were recorded as the cutting force.

The coated blades were then used to shave an individual's face an average of four times and the cutting force was again analyzed. For purposes of comparison, the same tests were performed on a commercially available blade of the same type which was coated with polytetrafluoroethylene. Results (the mean value) are given below:

| | Cutting force (grams) | | | |
|---|---|---|---|---|
| | Before shaving, mils | | After shaving, mils | |
| | 4 | 6 | 4 | 6 |
| Blade coated with copolymer: | | | | |
| A | 7.78 | 13.75 | 8.73 | 13.73 |
| B | 7.91 | 12.82 | 9.80 | 14.93 |
| C | 8.20 | 12.28 | 8.60 | 13.27 |
| D | 7.91 | 12.35 | 10.40 | 16.94 |
| E | 7.31 | 11.76 | 8.87 | 13.53 |
| F | 8.87 | 12.12 | ---- | ---- |
| Polytetrafluoroethylene | 8.59 | 13.11 | 8.67 | 13.13 |

When compared with the 30 grams of force necessary to cut a 6-mil fiber with an uncoated stainless steel blade, the results demonstrate the friction reduction provided by the coating of the invention, which in addition, compares favorably in this aspect to commercially acceptable coated blades.

EXAMPLE 2

Following the procedure described in Example 1 other copolymers containing 10 weight percent of the specified aminoalkylsiloxane units were prepared. The method of preparation was the same except that the toluene-water azeotrope was removed during reflux. Reactants are given in the table.

| Reactants | Copolymer formualtion | | |
|---|---|---|---|
| | A | B | C |
| Wt. percent dimethylsiloxane polymer No. 1 | 30 | 15 | 15 |
| Wt. percent dimethylsiloxane polymer No. 2 | 15 | 15 | 15 |
| Wt. percent dimethylsiloxane polymer No. 3 | | | 15 |
| Wt. percent dimethylsiloxane polymer No. 4 | | 15 | |
| Wt. percent $H_2N(CH_2)_2NH(CH_2)_3Si(OCH_3)_3$ | 5 | 5 | 5 |
| Toluene | 50 | 50 | 50 |

Polymer No. 1—same as No. 1 described in Example 1
Polymer No. 2—same as No. 2 described in Example 1
Polymer No. 3—2400cs. $HO[(CH_3)_2SiO]_nH$
Polymer No. 4—3700 cs. $HO[(CH_3)_2SiO]_nH$.

The copolymers were dip coated or spray coated from a 5% solution onto the previously described type of razor blades. After curing in the manner described in Example 1, the blades were tested as before. Results are given below for both the dip-coated and spray-coated blades.

| Blades dip-coated in 5 wt. percent solution of copolymer: | Cutting force (grams) | | | |
|---|---|---|---|---|
| | Before shaving, mils | | After shaving, mils | |
| | 4 | 6 | 4 | 6 |
| A | 9.26 | 13.33 | 10.17 | 15.32 |
| B | 8.98 | 14.02 | 10.76 | 17.16 |
| C | 9.19 | 14.28 | 12.03 | 18.00 |
| Blades spray-coated with 5 wt. percent solution of copolymer: | | | | |
| A | 8.20 | 12.09 | 10.03 | 16.02 |
| B | 8.32 | 12.37 | 9.90 | 15.50 |
| C | 9.05 | 13.21 | 9.24 | 13.71 |

Like the copolymeric coatings of Example 1, the above copolymeric coatings give a significant reduction in the force necessary for the blade to cut fibers. This reduction in cutting results in increased shaving comfort.

EXAMPLE 3

To demonstrate the durability of the coatings of the invention, blades spray coated with certain copolymers were tested by repeatedly cutting a 6-mil nylon fiber with the same point on the blade until the blade failed to cut the fiber. The force for each cut was recorded and in this manner the progressive behavior of the film coating was observed. For purposes of comparison, a commercially-available polytetrafluoroethylene coated stainless-steel blade was also treated.

| | Successive cuts | |
|---|---|---|
| | Number of cuts at failure | Cutting force (grams) at failure |
| Blade coated with: | | |
| Copolymer F, Example 1 | 431 | 16.9 |
| Copolymer A, Example 2 | 420 | 18.7 |
| Copolymer B, Example 2 | 333 | 19.1 |
| Copolymer C, Example 2 | 481 | 16.3 |
| Polytetrafluoroethylene | 300 | 17.9 |
| Coated in accordance with Example 1 of U.S. 2,937,976 | 23-166 | 15.6-25.5 |
| Coated in accordance with Example 5 of U.S. 2,937,976 | 34-117 | 16.9-23.6 |

This data demonstrates the durability of the copolymeric coating of the invention. As shown by comparison with the coatings of Examples 1 and 5 of U.S. 2,937,976, the copolymeric coatings are superior to organosilicon-containing polymeric coating of the prior art. While there is some gradual wearing of the film at the blade's edge, it is apparent from the cutting force analysis that, even at the fail-to-cut point, the copolymeric coatings are still present and provides lubrication.

Reasonable modification and variation are within the scope of the claims which sets forth improved cutting edges and a method of obtaining such cutting edges.

That which is claimed is:

1. An article containing a fine cutting edge of metal said edge having an adherent coating consisting essentially of an at least partially cured organosiloxane copolymer consisting of
   (1) 5 to 20 weight percent of polymeric units of the formula

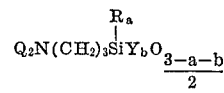

in which
   R is a lower alkyl radical containing no more than 6 carbon atoms;
   Y is selected from the group consisting of —OH and —OR' radicals, in which R' is an alkyl radical of no more than 3 carbon atoms;
   Q is selected from the group consisting of the hydrogen atom, —CH$_3$ and —CH$_2$CH$_2$NH$_2$;
   $a$ has a value of 0 or 1; and
   $b$ has a value of 0 or 1; the sum of $a+b$ being from 0 to 2; and
   (2) 80 to 95 weight percent of polymeric unit of the formula

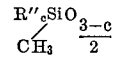

in which
   R'' is selected from the group consisting of —OH and —CH$_3$ radicals; and
   $c$ has a value of 1 or 2.

2. A safety razor blade having a cutting edge as defined in claim 1.

3. The blade of claim 2 wherein said metal is selected from the group consisting of high carbon steel and stainless steel.

4. The blade of claim 2 wherein the polymeric units (1) are of the formula

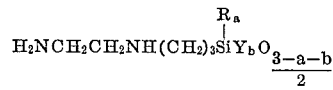

wherein
R is a lower alkyl radical containing no more than 6 carbon atoms;
Y is selected from the group consisting of —OH and —OR' radicals, in which R' is an alkyl radical of no more than 3 carbon atoms;
$a$ has a value of 0 to 1; and
$b$ has a value of 0 or 1; the sum of $a+b$ being from 0 to 2.

5. The blade of claim 2 wherein the polymeric units (1) are of the formula

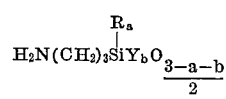

wherein
R is a lower alkyl radical containing no more than 6 carbon atoms;
Y is selected from the group consisting of —OH and —OR' radicals, in which R' is an alkyl radical of no more than 3 carbon atoms;
$a$ has a value of 0 or 1; and
$b$ has a value of 0 or 1; the sum of $a+b$ being from 0 to 2.

6. The blade of claim 2 wherein the polymeric units (1) are of the formula

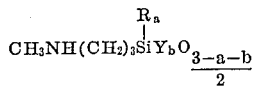

wherein
R is a lower alkyl radical containing no more than 6 carbon atoms;
Y is selected from the group consisting of —OH and —OR' radicals, in which R' is an alkyl radical of no more than 3 carbon atoms;
$a$ has a value of 0 or 1; and
$b$ has a value of 0 or 1; the sum of $a+b$ being from 0 to 2.

7. The blade of claim 2 wherein said copolymer consists of approximately 10 weight percent of units of the formula $H_2NCH_2CH_2NH(CH_3)_2SiO_{3/2}$ and 90 weight percent of units of the formula $(CH_3)_2SiO_{2/2}$, said copolymer being end blocked with $(CH_3)_3SiO$— units.

References Cited

UNITED STATES PATENTS

| | | |
|---|---|---|
| 2,937,976 | 5/1960 | Granahan et al. |
| 3,071,856 | 1/1963 | Fischbein. |
| 3,136,696 | 6/1964 | Harrison. |
| 3,224,094 | 12/1965 | Esemplare. |
| 3,355,424 | 11/1967 | Brown. |

FOREIGN PATENTS

| | | |
|---|---|---|
| 110,301 | 10/1960 | Pakistan. |

MURRAY KATZ, Primary Examiner

H. J. GWINNELL, Assistant Examiner

U.S. Cl. X.R.

117—135.1